US009605122B2

(12) United States Patent
Takatsu et al.

(10) Patent No.: US 9,605,122 B2
(45) Date of Patent: Mar. 28, 2017

(54) GAS-BARRIER MULTILAYER FILM

(75) Inventors: Youji Takatsu, Inuyama (JP); Yumi Tsumagari, Inuyama (JP); Takeshi Ookawa, Inuyama (JP); Yoshiharu Morihara, Inuyama (JP); Syuusei Matsuda, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 13/388,227

(22) PCT Filed: Jul. 27, 2010

(86) PCT No.: PCT/JP2010/062642
§ 371 (c)(1),
(2), (4) Date: Jan. 31, 2012

(87) PCT Pub. No.: WO2011/013677
PCT Pub. Date: Feb. 3, 2011

(65) Prior Publication Data
US 2012/0128956 A1 May 24, 2012

(30) Foreign Application Priority Data
Jul. 31, 2009 (JP) ................................ 2009-179154
Mar. 26, 2010 (JP) ................................ 2010-073681

(51) Int. Cl.
*B32B 7/02* (2006.01)
*B32B 27/00* (2006.01)
*C08J 7/04* (2006.01)

(52) U.S. Cl.
CPC ....... *C08J 7/045* (2013.01); *Y10T 428/24975* (2015.01); *Y10T 428/265* (2015.01)

(58) Field of Classification Search
None
See application file for complete search history.

(56) References Cited

U.S. PATENT DOCUMENTS

| | | | |
|---|---|---|---|
| 5,766,751 A | 6/1998 | Kotani et al. | |
| 5,770,301 A | 6/1998 | Murai et al. | |
| 5,942,298 A * | 8/1999 | Sakaya et al. | 428/36.6 |
| 6,146,750 A | 11/2000 | Kotani et al. | |
| 6,165,574 A | 12/2000 | Bentmar et al. | |
| 6,316,093 B1 | 11/2001 | Kotani et al. | |
| 6,426,135 B1 | 7/2002 | Kotani et al. | |
| 6,569,533 B1 * | 5/2003 | Uchida et al. | 428/423.1 |
| 7,811,669 B2 | 10/2010 | Fujii et al. | |
| 8,434,637 B2 | 5/2013 | Mita et al. | |
| 2004/0191552 A1 * | 9/2004 | Nakamura | B32B 27/32 428/515 |
| 2005/0084686 A1 | 4/2005 | Imaizumi | |
| 2005/0214530 A1 | 9/2005 | Tanaka et al. | |
| 2006/0062995 A1 | 3/2006 | Yamamoto | |
| 2007/0224402 A1 * | 9/2007 | Yoshida et al. | 428/220 |
| 2007/0269664 A1 | 11/2007 | Fujii et al. | |
| 2009/0022981 A1 * | 1/2009 | Yoshida et al. | 428/336 |
| 2009/0029854 A1 * | 1/2009 | Maruyama et al. | 503/214 |
| 2009/0035424 A1 | 2/2009 | Mita et al. | |
| 2009/0130368 A1 | 5/2009 | Beihoffer et al. | |
| 2009/0148640 A1 * | 6/2009 | Yoshida et al. | 428/36.6 |
| 2009/0181244 A1 | 7/2009 | Fukugami et al. | |
| 2010/0015431 A1 * | 1/2010 | Matsui et al. | 428/323 |
| 2012/0270058 A1 | 10/2012 | Tsumagari et al. | |

FOREIGN PATENT DOCUMENTS

| | | |
|---|---|---|
| EP | 1 561 840 A1 | 8/2005 |
| JP | 07-251475 A | 10/1995 |
| JP | 10-086268 A | 4/1998 |
| JP | 2929609 B2 | 5/1999 |
| JP | 11-314320 A | 11/1999 |
| JP | 2000-006342 A | 1/2000 |
| JP | 2000-043182 A | 2/2000 |
| JP | 2000-052499 A | 2/2000 |
| JP | 2000-071395 A | 3/2000 |
| JP | 2000-263727 A | 9/2000 |

(Continued)

OTHER PUBLICATIONS

Japanese Patent Office, Notice of Reasons for Rejection in Japanese Patent Application No. 2009-179154 (Feb. 26, 2013).
Japanese Patent Office, International Search Report in International Patent Application No. PCT/JP2010/062642 (Sep. 21, 2010).
Japanese Patent Office, Notice of Reasons for Rejection in Japanese Patent Application No. JP 2010-073683 (Oct. 15, 2013).
European Patent Office, Extended European Search Report in European Patent Application No. 10839462.8 (Nov. 29, 2013).
European Patent Office, Extended European Search Report in European Patent Application No. 10804423.1 (Dec. 18, 2013).
Japanese Patent Office, Office Action in Japanese Patent Application No. 2011-066789 (Oct. 14, 2014).
Japanese Patent Office, Office Action in Japanese Patent Application No. 2011-066790 (Oct. 14, 2014).

(Continued)

*Primary Examiner* — Ronak Patel
(74) *Attorney, Agent, or Firm* — Leydig, Voit & Mayer, Ltd.

(57) ABSTRACT

Provided is a gas-barrier multilayer film which decreases little in gas-barrier properties even through retortion and which suffers no delamination. The gas-barrier multilayer film is characterized by comprising a plastic film and, superposed directly or through other layer on at least one surface thereof in the following order, an inorganic thin film layer and a gas-barrier resin composition layer. The gas-barrier film is further characterized in that the gas-barrier resin composition layer has been formed from a gas-barrier resin composition comprising a gas-barrier resin constituted of an ethylene/vinyl alcohol copolymer, an inorganic lamellar compound, and an additive, that the content of the inorganic lamellar compound in the gas-barrier resin composition is 0.1-9.0 mass %, that the additive is a coupling agent and/or a crosslinking agent, and that the gas-barrier resin composition layer has a thickness of 0.05-0.5 μm.

13 Claims, No Drawings

(56) References Cited

FOREIGN PATENT DOCUMENTS

| | | |
|---|---|---|
| JP | 2001-519739 A | 10/2001 |
| JP | 2002-178440 A | 6/2002 |
| JP | 2002-249565 A | 9/2002 |
| JP | 3441594 B2 | 6/2003 |
| JP | 2004-175011 A | 6/2004 |
| JP | 2004-262143 A | 9/2004 |
| JP | 3681426 B2 | 5/2005 |
| JP | 2005-288948 A | 10/2005 |
| JP | 2005-324361 A | 11/2005 |
| JP | 2005-349769 A | 12/2005 |
| JP | 2006-056007 A | 3/2006 |
| JP | 2006-056927 A | 3/2006 |
| JP | 2007-290144 A | 11/2007 |
| JP | 2007-290292 A | 11/2007 |
| JP | 2008-200975 A | 9/2008 |
| JP | 2008-297527 A | 12/2008 |
| JP | 2009-006508 A | 1/2009 |
| JP | 2009-248456 A | 10/2009 |
| JP | 2009-289945 A | 12/2009 |
| JP | 5434341 B2 | 3/2014 |
| WO | WO 2006/107048 A1 | 10/2006 |
| WO | WO 2007/034773 A1 | 3/2007 |
| WO | WO 2007/040609 * | 4/2007 |
| WO | WO 2007/040609 A1 | 4/2007 |

OTHER PUBLICATIONS

Japanese Patent Office, International Search Report in International Patent Application No. PCT/JP2010/073160 (Apr. 5, 2011).
Japanese Patent Office, Notification of Reasons for Rejections in Japanese Patent Application No. 2010-285042 (Jun. 24, 2014).
Japanese Patent Office, Office Action in Japanese Patent Application No. 2011-066788 (Nov. 25, 2014).
U.S. Appl. No. 13/517,196, filed Jun. 19, 2012.

* cited by examiner

GAS-BARRIER MULTILAYER FILM

TECHNICAL FIELD

The present invention relates to a gas-barrier multilayer film having transparency, being superior in gas-barrier properties against steam, oxygen, and so on, and being suitable as a film for packaging foods, medicaments, and so on. More particularly, it relates to a gas-barrier multilayer film with which good gas-barrier property and good adhesion property (lamination strength) can be obtained even if a retort treatment is applied thereto.

BACKGROUND ART

Conventionally known gas-barrier films include films in which thin films of metal such as aluminum or thin films of inorganic oxides such as silicon oxide and aluminum oxide have been laminated on the surface of a plastic film. In particular, films in which thin films of inorganic oxides such as silicon oxide, aluminum oxide, and a mixture thereof has been laminated have been used widely for food applications because they are transparent and contents can be checked therethrough.

However, pinholes, cracks, and so on are easily formed in such inorganic thin films during a thin film formation process and inorganic thin film layers crack during a processing step, and because of this, desired sufficiently high gas-barrier properties have not been obtained. Then, as a method for improving such defects, an attempt to further form a gas-barrier layer on an inorganic thin film has been made. As a gas-barrier film obtained by such a method, a gas-barrier film in which an inorganic thin film has been coated with a resin layer containing an inorganic layered compound having a specific particle diameter and a specific aspect ratio has been disclosed (for example, Patent Document 1).

In addition, many films in which the surface of a plastic film has been coated with a resin composition having high gas-barrier properties have been proposed. As to resin compositions to be used for such films, a method that involves dispersing a flat inorganic substance such as an inorganic layered compound in a resin has also been known as a method for improving gas-barrier properties; for example, a product in which a barrier coating layer composed of an ethylene-vinyl alcohol-based copolymer, a water-soluble zirconium-based cross-linking agent, and an inorganic layered compound has been formed on a substrate film (for example, Patent Document 2) has been proposed.

Despite of the use of these methods, however, there have not been obtained gas-barrier films with which gas-barrier properties and lamination strength after retort treatment can be fully satisfied and which are stable in quality though improvement in characteristics under boiling or high humidity has been recognized.

PRIOR ART DOCUMENTS

Patent Documents

Patent Document 1: Japanese Patent No. 3681426
Patent Document 2: JP 2008-297527 A

SUMMARY OF THE INVENTION

Problems to be Solved by the Invention

The present invention has been made in consideration of the problems of these conventional technologies. That is, an object of the present invention is to provide a gas-barrier multilayer film being superior in gas-barrier properties, having interlayer adhesion property, and being usable for applications for packaging various foods, medicaments, and industrial products, as well as industrial applications, such as solar batteries, electronic papers, organic EL devices, and semiconductor devices. In particular, an object of the present invention is to provide a gas-barrier multilayer film that decreases little in gas-barrier properties even through retort treatment and that suffers no interlayer delamination.

Means for Solving the Problem

The gas-barrier multilayer film of the present invention that has solved the above problem, comprising a plastic film and, an inorganic thin film layer and a gas-barrier resin composition layer being stacked in this order with or without intervention of other layers on at least one surface of the plastic film, wherein the gas-barrier resin composition layer is formed from a gas-barrier resin composition comprised of a gas-barrier resin including an ethylene-vinyl alcohol-based copolymer, an inorganic layered compound, and an additive, the content of the inorganic layered compound in the gas-barrier resin composition is from 0.1% by mass to 9.0% by mass, and the additive is a coupling agent and/or a cross-linking agent, and the thickness of the gas-barrier resin composition layer is from 0.05 μm to 0.5 μm.

The inorganic layered compound is preferably smectite. It is preferred that the inorganic thin film layer comprises at least an inorganic oxide.

In the case of using a coupling agent as an additive, the coupling agent is preferably a silane coupling agent having at least one kind of organic functional group.

In the case of using a cross-linking agent as an additive, the cross-linking agent is preferably a cross-linking agent for a group capable of forming a hydrogen bond.

In these cases, the total content of the additive (the coupling agent and the cross-linking agent) in the gas-barrier resin composition is preferably from 0.3% by mass to 20% by mass.

In the preferred embodiment, the gas-barrier multilayer film has an anchor coating layer having a thickness of from 0.05 μm to 0.5 μm between the inorganic thin film layer and the gas-barrier resin composition layer.

The anchor coating agent resin composition for forming the anchor coating layer preferably comprises a silane coupling agent having at least one kind of organic functional group.

The amount of the silane coupling agent added in the anchor coating agent resin composition for forming the anchor coating layer is preferably from 0.1% by mass to 10% by mass.

Effects of the Invention

According to the present invention, there can be obtained a gas-barrier multilayer film having superior gas-barrier properties against oxygen and steam, being high in interlayer adhesion power, and being superior in lamination strength. In particular, a gas-barrier multilayer film can be obtained which decreases little in gas-barrier properties and interlayer adhesion power even through retort treatment and which is suitable for various applications and high in practicality. Moreover, a gas-barrier multilayer film is formed which is superior in production stability and with which uniform characteristics can be obtained easily.

MODE FOR CARRYING OUT THE INVENTION

The gas-barrier multilayer film of the present invention includes a plastic film and, an inorganic thin film layer and a gas-barrier resin composition layer being stacked in this order with or without intervention of other layers on at least one surface of the plastic film. Hereafter, the gas-barrier multilayer film of the present invention is described layer by layer.

1. Gas-Barrier Resin Composition Layer

The gas-barrier resin composition layer is formed from a gas-barrier resin composition. The above-mentioned gas-barrier resin composition is comprised of a gas-barrier resin including an ethylene-vinyl alcohol-based copolymer (hereinafter may be referred to as "EVOH"), an inorganic layered compound, and an additive. Hereafter, description is made to each configuration of the gas-barrier resin composition layer.

1-1. Gas-Barrier Resin

Examples of the EVOH that can be used as a gas-barrier resin include products obtainable by saponifying ethylene-vinyl acetate-based copolymers. Specific examples of the products obtainable by saponifying ethylene-vinyl acetate-based copolymers include a product obtainable by saponifying an ethylene-vinyl acetate copolymer obtainable by copolymerizing ethylene and vinyl acetate; and a product obtainable by saponifying an ethylene-vinyl acetate-based copolymer obtainable by copolymerizing ethylene and vinyl acetate together with other monomers. In the present invention, copolymers obtainable by copolymerizing ethylene and vinyl acetate and copolymers obtainable by copolymerizing ethylene and vinyl acetate together with other monomers are collectively referred to as "ethylene-vinyl acetate-based copolymers."

In the case of an ethylene-vinyl acetate-based copolymer, it is preferred that the ethylene ratio in the monomer composition before copolymerization be from 20 mol % to 60 mol %. If the ethylene ratio is 20 mol % or more, gas-barrier properties under high humidity will improve more and a decrease in lamination strength after retort treatment will be suppressed more. On the other hand, if the ethylene ratio is 60 mol % or less, gas-barrier properties will improve more. Copolymers having a degree of saponification of vinyl acetate component of 95 mol % or more are preferred as the ethylene-vinyl acetate-based copolymer. If the degree of saponification of vinyl acetate component is 95 mol % or more, gas-barrier properties and oil resistance will become better.

The EVOH may be one prepared by applying treatment with a peroxide or the like for molecular chain scission, thereby reducing the molecular weight in order to improve dissolution stability in a solvent.

Examples of the peroxide include the following (1) through (7):
(1) $H_2O_2$
(2) $M_2O_2$ type (M: Na, K, $NH_4$, Rb, Cs, Ag, Li, etc.)
(3) $M'O_2$ type (M': Mg, Ca, Sr, Ba, Zn, Cs, Hg, etc.)
(4) R—O—O—R type (R represents an alkyl group; the same shall apply hereinafter): dialkyl peroxides such as diethyl peroxide
(5) R—CO—O—O—CO—R type: acyl peroxides such as diacetyl peroxide, diamyl peroxide, and dibenzoyl peroxide
(6) acid peroxide type
  a) acids having an —O—O— linkage: persulfuric acid ($H_2SO_5$), perphosphoric acid ($H_3PO_5$), etc.
  b) R—CO—O—OH: performic acid, peracetic acid, perbenzoic acid, perphthalic acid, etc.
(7) hydrogen peroxide inclusion compounds: $(NaOOH)_2/H_2O_2$, $(KOOH)_2/3H_2O_2$, etc.

Among these, hydrogen peroxide is particularly preferred because it can be decomposed easily afterwards using a reducing agent, a reducing enzyme, or a catalyst.

A method of treating EVOH with a peroxide is not particularly restricted and known treating methods can be used. Specific examples thereof include a method in which a peroxide and a catalyst for molecular chain scission (e.g., iron sulfate) are added to a solution in which EVOH has been dissolved (this may hereinafter be referred to as an "EVOH solution"), followed by heating at 40 to 90° C. under stirring.

More particularly, in an exemplary method using hydrogen peroxide as a peroxide, hydrogen peroxide (usually 35% by mass aqueous solution) is added to a solution in which an EVOH solution has been dissolved in a solvent described later and treatment is then performed at a temperature of 40° C. to 90° C. for 1 hour to 50 hours under stirring. The amount of hydrogen peroxide (35% by mass aqueous solution) added is approximately 3 parts by mass to 300 parts by mass relative to 100 parts by mass of the EVOH in the solution. In order to adjust the reaction rate of oxidative decomposition, a metal catalyst ($CuCl_2$, $CuSO_4$, $MoO_3$, $FeSO_4$, $TiCl_4$, $SeO_2$, etc.) may be added in an amount of about 1 ppm to 5000 ppm (on a mass basis; the same shall apply hereinafter) per the EVOH solution may also be added as a catalyst for molecular chain scission. The point at which the viscosity of the solution has become about 10% or less of the initial viscosity can be determined as an indication of the end point of such treatment. By removing the solvent from the solution after the end of treatment by known methods, it is possible to obtain a carboxylic acid-terminated EVOH having carboxyl groups of from about 0.03 meq/g to about 0.2 meq/g at molecular terminals.

1-2. Inorganic Layered Compound

Examples of the inorganic layered compound include clay minerals, such as smectite, kaolin, mica, hydrotalcite, and chlorite. Specific examples thereof include montmorillonite, beidellite, saponite, hectorite, sauconite, stevensite, kaolinite, nacrite, dickite, halloysite, hydrated halloysite, tetrasilylic mica, sodium taeniolite, muscovite, margarite, phlogopite, talc, antigorite, chrysotile, pyrophyllite, vermiculite, xanthophylite, and chlorite. Scaly silica and the like can also be used. These may be used singly or two or more thereof may be used in combination. Among these, smectite (including its synthesized products) is particularly preferred.

Inorganic layered compounds in which metal ions having redox ability, especially iron ions, are present are preferred. Among such compounds, montmorillonite is preferred from the viewpoints of coatability and gas-barrier properties. As such montmorillonite, known products having been conventionally used as a gas-barrier agent can be used. For example, there can be used montmorillonite group minerals represented by general formula:$(X,Y)_{2-3}Z_4O_{10}(OH)_2 \cdot mH_2O \cdot (W\omega)$, wherein X represents Al, Fe(III), or Cr(III); Y represents Mg, Fe(II), Ni, Zn, or Li; Z represents Si or Al; W represents K, Na, or Ca; $H_2O$ represents interlayer water; and m and ω each represent a positive real number. Among these, compounds wherein W is Na are preferred from the viewpoint that they are cleaved in an aqueous medium. Moreover, the particle diameter of an inorganic layered compound is preferably 5 μm or less, and the aspect ratio thereof is preferably within a range of from 50 to 5000, and particularly from 200 to 3000.

The content of the inorganic layered compound in the gas-barrier resin composition (the total of the gas-barrier resin, the inorganic layered compound, and the additive is 100% by mass) is 0.1% by mass or more, preferably 0.5% by mass or more, more preferably 1.0% by mass or more, and even more preferably 1.2% by mass or more; it is 9.0% by mass or less, preferably 7.0% by mass or less, more preferably 6.0% by mass or less, and even more preferably 5.0% by mass or less. If the content of the inorganic layered compound is less than 0.1% by mass, gas-barrier properties will deteriorate due to retort treatment or lamination strength after retort treatment will deteriorate. On the other hand, if the content of the inorganic layered compound exceeds 9.0% by mass, lamination strength and gas-barrier properties will be deteriorated by retort treatment. It is supposed that gas-barrier properties have lowered for reasons that delamination occurs between the inorganic thin film layer and the gas-barrier resin layer because interlayer peeling strength is lowered by retort treatment or cracks are formed in the gas-barrier resin layer by various stress during use, vibration, and the stress of shower water used during retort treatment because the softness of the gas-barrier resin layer lowers.

Heretofore, it has been considered that gas-barrier properties are low when the amount of an inorganic layered compound incorporated in a gas-barrier resin composition layer is small, whereas gas-barrier properties are high when the amount incorporated is large. In the case of laminating with an inorganic thin film layer as in the present invention, however, high gas-barrier properties are exhibited due to a synergistic effect with an inorganic thin film even if the content of an inorganic layered compound in a gas-barrier resin composition layer is relatively small. This is probably because a gas-barrier resin composition layer on an inorganic thin film layer has functions not only to fill defects caused by pinholes and cracks of the inorganic thin film but also to prevent damages, such as cracking, of the inorganic thin film and it fully fulfills the function to fill defects even if the content of the inorganic layered compound is small. On the contrary, it is considered that if the content of the inorganic layered compound increases, such phenomena as a decrease in interlayer adhesion power during retort treatment and a decrease in the softness of a film occur, resulting in deterioration of a function to prevent the damage of an inorganic film, so that an effect to further improve gas-barrier properties is not obtained as a whole, but a decrease in gas-barrier properties is caused.

The amount of the inorganic layered compound incorporated is preferably 0.5 parts by mass or more, more preferably 1 part by mass or more, and even more preferably 3 parts by mass or more relative to 100 parts by mass of the gas-barrier resin; it is preferably 10 parts by mass or less, more preferably 9 parts by mass or less, and even more preferably 8 parts by mass or less.

1-3. Additives

In the present invention, the gas-barrier resin composition contains at least one kind of coupling agent and cross-linking agent as additives. The coupling agent is not particularly restricted if it is one that can be used for a resin composition and a silane coupling agent having at least one kind of organic functional group is preferred. Examples of such an organic functional group include an epoxy group, an amino group, an alkoxy group, and an isocyanate group.

Specific examples of the silane coupling agent having at least one kind of organic functional group include: epoxy group-containing silane coupling agents such as 2-(3,4-epoxycyclohexyl)ethyltrimethoxysilane, 2-(3,4-epoxycyclohexyl)ethyltriethoxysilane, 3-(3,4-epoxycyclohexyl)propyltrimethoxysilane, 2-glycidyloxyethyltrimethoxysilane, 2-glycidyloxyethyltriethoxysilane, 3-glycidyloxypropyltrimethoxysilane, and 3-glycidyloxypropyltriethoxysilane; amino group-containing silane coupling agents such as 2-aminoethyltrimethoxysilane, 3-aminopropyltrimethoxysilane, 3-aminopropyltriethoxysilane, 2-[N-(2-aminoethyl)amino]ethyltrimethoxysilane, 3-[N-(2-aminoethyl)amino]propyltrimethoxysilane, 3-[N-(2-aminoethyl)amino]propyltriethoxysilane, and 3-[N-(2-aminoethyl)amino]propylmethyldimethoxysilane; alkoxy group-containing silane coupling agents such as dimethyldimethoxysilane, dimethyldiethoxysilane, methyltrimetoxysilane, methyltriethoxysilane, ethyltrimethoxysilane, ethyltriethoxysilane, tetramethoxysilane, tetraethoxysilane, tetrapropoxysilane, diphenyldimethoxysilane, diphenyldiethoxysilane, phenyltrimethoxysilane, and phenyltriethoxysilane; and isocyanate group-containing silane coupling agents such as γ-isocyanatopropyltrimethoxysilane, γ-isocyanatopropyltriethoxysilane, γ-isocyanatopropylmethyldimethoxysilane, and γ-isocyanatopropylmethyldiethoxysilane. These may be used singly or two or more thereof may be used in combination.

The cross-linking agent is not particularly restricted as long as it is a cross-linking agent usable for resin compositions, and a cross-linking agent for a group capable of forming a hydrogen bond is preferred. Examples of the cross-linking agent for a group capable of forming a hydrogen bond include water-soluble zirconium compounds and water-soluble titanium compounds. Specific example of the water-soluble zirconium compounds include zirconium oxydichloride, zirconium hydroxychloride, basic zirconium sulfate, zirconium nitrate, zirconium ammonium carbonate, zirconium sodium sulfate, zirconium sodium citrate, zirconium lactate, zirconium acetate, zirconium sulfate, zirconium oxysulfate, zirconium oxynitrate, basic zirconium carbonate, zirconium hydroxide, zirconium potassium carbonate, zirconium chloride, zirconium chloride octahydrate, zirconium oxychloride, monohydroxytris(lactate) zirconium ammonium, tetrakis(lactate) zirconium ammonium, and monohydroxytris(slate) zirconium ammonium. Among these, zirconium oxydichloride and zirconium hydroxychloride are preferred from the viewpoints of suitability for hot water treatment after hot water treatment due to improvement in application cohesive force and the stability of a coating liquid for forming a gas-barrier resin composition layer; in particular, zirconium oxydichloride is preferred. Specific examples of the water-soluble titanium compound include titanium lactate, ammonium titanium lactate, diisopropoxytitanium (triethanolaminate), di-n-butoxytitanium bis(triethanolaminate), diisopropoxytitanium bis(triethanolaminate), and titanium tetrakis(acetylacetonate). These may be used singly or two or more thereof may be used in combination. The content of the additive (the coupling agent and the cross-linking agent) in the gas-barrier resin composition (the total of the gas-barrier resin, the inorganic layered compound, and the additive is 100% by mass) is preferably 0.3% by mass or more, more preferably 0.5% by mass or more, even more preferably 1% by mass or more, and most preferably 8% by mass or more; it is preferably 20% by mass or less, more preferably 18% by mass or less, even more preferably 15% by mass or less, and most preferably 12% by mass or less. By adjusting the content of additives within the above-mentioned range, it is possible to further suppress a decrease in lamination strength after retort treatment.

The amount of the additive incorporated is preferably 0.5 parts by mass or more, more preferably 1 part by mass or more, and even more preferably 3 parts by mass or more relative to 100 parts by mass of the gas-barrier resin; it is preferably 15 parts by mass or less, more preferably 13 parts by mass or less, and even more preferably 12 parts by mass or less.

1-4. Forming Method

Examples of methods for forming a gas-barrier resin composition layer on an inorganic thin film layer include: a method that includes applying a coating liquid prepared by dissolving or dispersing each material of a gas-barrier resin composition in a solvent onto an inorganic thin film layer; a method that includes melting a gas-barrier resin composition, extruding it onto an inorganic thin film layer, followed by lamination; and a method that includes forming a film of a gas-barrier resin composition separately and bonding the film onto an inorganic thin film layer with an adhesive or the like. Among these, the method by application is preferred from the viewpoints of simplicity, productivity, and so on. At this time, it is also permitted to provide an anchor coating layer on the inorganic thin film layer and also provide the gas-barrier resin composition layer on the anchor coating layer. Such an anchor coating layer is described below.

As one example of a method for forming a gas-barrier resin composition layer, a method that includes applying a coating liquid prepared by dissolving or dispersing each material of a gas-barrier resin composition in a solvent onto an inorganic thin film layer is described below.

Either an aqueous solvent or a non-aqueous solvent, both capable of dissolving EVOH, can be used as a solvent for forming a coating liquid from a gas-barrier resin composition; the use of a mixed solvent of water and a lower alcohol is preferred. Specifically, a mixed solvent of water and a lower alcohol having 2 to 4 carbon atoms (ethanol, n-propanol, isopropyl alcohol, n-butanol, isobutyl alcohol, sec-butyl alcohol, tert-butyl alcohol, etc.) is preferred. If such a mixed solvent is used, the solubility of EVOH becomes good, so that a moderate solid concentration can be maintained. The content of the lower alcohol in the mixed solvent is preferably from 15% by mass to 70% by mass. If the content of the lower alcohol in the mixed solvent is 70% by mass or less, cleavage of the inorganic layered compound proceeds more when the inorganic layered compound is dispersed; if it is 15% by mass or more, the coatability of a coating liquid in which a gas-barrier resin composition has been dissolved or dispersed improves more.

A method of dissolving or dispersing a gas-barrier resin composition in a solvent is not particularly restricted, and examples thereof include: a method that includes adding and mixing an inorganic layered compound, which may have been swollen or cleaved into a dispersion medium, such as water, beforehand, if necessary) in an EVOH solution, thereby dispersing the inorganic layered compound; and a method that includes adding (dissolving) EVOH into a dispersion liquid prepared by swelling/cleaving an inorganic layered compound in a dispersion medium, such as water. At this time, the gas-barrier resin including EVOH and the inorganic layered compound are mixed in such a mass ratio that the content of the inorganic layered compound becomes within a range of from 0.1 parts by mass to 10 parts by mass relative to 100 parts by mass of the gas-barrier resin composition.

In such mixing, while the inorganic layered compound can be dispersed uniformly by using a usual stirring instrument or a usual dispersing instrument, a high pressure dispersion machine can be used particularly for obtaining a transparent, stable inorganic layered compound dispersion liquid. Examples of the high pressure dispersion machine include Gaulin (manufactured by APV Gaulin), Nanomizer (manufactured by Nanomizer Inc.), Microfluidizer (manufactured by Microflydex Co., Ltd.), Multimizer (manufactured by Sugino Machine Ltd.), and DeBEE (manufactured by BEE International, Inc.), and as to the pressure condition of such high pressure dispersion machines, it is preferable to perform a dispersion treatment at 100 MPa or lower. If the pressure condition is 100 MPa or lower, pulverization of the inorganic layered compound can be suppressed, so that a desired gas-barrier property becomes good. While additives may be added at any time because the mixing thereof can be performed by merely stirring, it is preferable to add additives at a stage where the inorganic layered compound has been dispersed completely in the EVOH solution from the viewpoint of suppressing the influence of the additives as much as possible. As to the coating system, conventional systems, such as gravure coating, bar coating, die coating, and spray coating, can be employed according to the property of the coating liquid.

1-5. Conditions of Drying Coating Liquid for Gas-Barrier Resin Composition Layer The drying temperature after applying a coating liquid of a gas-barrier resin composition is preferably 100° C. or higher, more preferably 130° C. or higher, and even more preferably 150° C. or higher; it is preferably 200° C. or lower. It is also effective to perform an additional heat treatment in a separate treatment step, specifically an additional heating treatment (150 to 200° C.) while rewinding a film after winding it, or with a roll, or before or during execution of a post process such as a lamination process. If the drying temperature is 100° C. or higher, a coating layer can be dried sufficiently and crystallization and cross-linking of a gas-barrier resin composition layer proceeds, so that gas-barrier properties and lamination strength after retort treatment become better. On the other hand, if the drying temperature is 200° C. or lower, a plastic film is inhibited from being exposed excessively to heat, so that the film is inhibited from becoming brittle or shrinking and processability becomes good.

1-6. Thickness of Gas-Barrier Resin Composition Layer

The thickness of a gas-barrier resin composition layer is 0.05 µm or more, preferably 0.10 µm or more, and more preferably 0.15 µm or more; it is 0.5 µm or less, preferably 0.3 µm or less, and more preferably 0.2 µm or less. If the thickness is less than 0.05 µm, gas-barrier properties after retort treatment deteriorate, whereas if the thickness exceeded 0.5 µm, when a coating liquid is used, insufficient drying of the coating liquid occurs, so that a gas-barrier resin composition layer becomes brittle and lamination strength after retort treatment lowers.

2. Plastic Film

The plastic film to be used in the present invention is a film that includes an organic macromolecule resin and has been prepared by performing melt-extrusion and then, if necessary, applying drawing in the longitudinal direction and/or the transverse direction, cooling, and heat setting. Examples of the organic macromolecule include: polyamide, polyester, polyolefin, polyvinyl chloride, polyvinylidene chloride, polyvinyl alcohol, total aromatic polyamide, polyamide-imide, polyimide, polyetherimide, polysulfone, polystyrene, and polylactic acid.

Specific examples of the polyamide include polycaproamide (nylon 6), poly-ε-aminoheptanoic acid (nylon 7), poly-ε-aminononanoic acid (nylon 9), polyundecanamide (nylon 11), polylaurinlactam (nylon 12), polyethylene diamine adipamide (nylon 2•6), polytetramethylene adipamide (nylon 4•6), polyhexamethylene adipamide (nylon 6•6), polyhexamethylene sebacamide (nylon 6•10), polyhexamethylene dodecamide (nylon 6•12), polyoctamethylene dodecamide (nylon 6•12), polyoctamethylene adipamide (nylon 8•6), polydecamethylene adipamide (nylon 10•6), polydecamethylene sebacamide (nylon 10•10), polydodecamethylene dodecamide (nylon 12•12), and metaxylenediamine-6-nylon (MXD6). Moreover, copolymers containing these polyamides as main ingredients are also usable and examples thereof include caprolactam/laurinlactam copolymers, caprolactam/hexamethylenediammonium adipate copolymers, laurinlactam/hexamethylenediammonium adipate copolymers, hexamethylenediammonium adipate/hexamethylenediammonium sebacate copolymers, ethylenediammonium adipate/hexamethylenediammonium adipate copolymers, and caprolactam/hexamethylenediammonium adipate/hexamethylenediammonium sebacate copolymers. It is also effective to incorporate plasticizers such as aromatic sulfonamides, p-hydroxybenzoic acid and esters, elastomer components having low elastic moduli, and lactams for modifying the softness of films, into such polyamides.

Specific examples of the polyesters include polyethylene terephthalate, polybutylene terephthalate, and polyethylene-2,6-naphthalate. Moreover, copolymers containing these polyesters as main components are also usable; when a polyester copolymer is used, aromatic dicarboxylic acids, such as terephthalic acid, isophthalic acid, phthalic acid, and 2,6-naphthalenedicarboxylic acid; polyfunctional carboxylic acids, such as trimellitic acid and pyromellitic acid; aliphatic dicarboxylic acids, such as adipic acid and sebacic acid, and so on are used as its dicarboxylic acid component. As its glycol component, aliphatic glycols, such as ethylene glycol, 1,4-butanediol, diethylene glycol, propylene glycol, and neopentyl glycol; aromatic glycols, such as p-xylylene glycol; alicyclic glycols, such as 1,4-cyclohexanedimethanol; polyethylene glycols having average molecular weights of 150 to 20000; and so on are used. A preferred proportion of copolymerized components in 100 mol % of a polyester is 20 mol % or less. When the copolymerized component exceeds 20 mol %, the film may be inferior in film strength, transparency, heat resistance, and so on. Such organic macromolecules may be copolymerized further with a small amount of other monomers or blended with other organic macromolecules.

The gas-barrier multilayer film of the present invention is used as a barrier film for a solar battery, a barrier film for an organic electroluminescence, or a barrier film for an electronic paper, polyethylene terephthalate or polyethylene naphthalate is preferred as the organic macromolecule resin for constituting the plastic film. In particular, when it is used as a barrier film of a solar battery, the acid value of the plastic film is preferably 10 equivalents/ton or less, more preferably 5 equivalents/ton or less because it is desired to have high resistance to hydrolysis.

When polyethylene terephthalate is used, the intrinsic viscosity (IV value) thereof is preferably 0.60 or more and more preferably 0.65 or more; it is preferably 0.90 or less, and more preferably 0.80 or less. It is noted that the IV value is a value measured at 30° C. in a mixed solvent of phenol/1,1,2,2-tetrachloroethane (with a mass ratio of 6/4).

The content of the cyclic trimer in polyethylene terephthalate is preferably 0.7% by mass or less, and more preferably 0.5% by mass or less.

As a polycondensation catalyst for polyethylene terephthalate or polyethylenenaphthalate, compounds of antimony, germanium, titanium, aluminum, phosphorus, and so on are preferred; in particular, polymerization catalysts including aluminum compounds and phosphorus compounds are preferred and the catalysts disclosed in JP 2002-249565 A can be used. As the aluminum compounds, aluminum acetate, basic aluminum acetate, aluminum chloride, aluminum hydroxide, aluminum acetylacetonate, and so on are preferred. As the phosphorus compounds, phosphonic acid compounds having a hindered phenol structure are preferred and specific examples thereof include Irganox (registered trademark) 1222, 1425 (produced by Ciba Japan).

Moreover, to the above-mentioned organic macromolecule resins may be added known additives, such as UV absorbers, antistatic agents, plasticizers, lubricants, and colorants. The thickness of the plastic film is preferably 1 μm or more, more preferably 2 μm or more, and even more preferably 3 μm or more; it is preferably 500 μm or less, more preferably 300 μm or less, and even more preferably 100 μm or less. While the transparency of the plastic film is not particularly limited, one having a light transmittance of 50% or more is desirable in use as a packaging material layered article with transparency. The plastic film may be a layered film. The kind, number of layers, method of lamination, and so on of a layered article in forming into a layered film are not particularly limited and may be selected optionally from known methods according to an intended purpose.

As to a method for producing of the plastic film, existing methods, such as an extrusion method and a casting method, can be used. Unless the purpose of the present invention is not impaired, the plastic film in the present invention may be subjected to a surface treatment, such as a corona discharge treatment, glow discharge, a flame treatment, and a surface roughening treatment, prior to lamination of the inorganic thin film layer, and a known anchor coating treatment, printing, or decoration may be applied.

3. Inorganic Thin Film Layer

The inorganic thin film layer is a film including metal or an inorganic oxide. A material for forming the metal thin film is not particularly restricted as long as it is one that can be formed into a film; examples thereof include magnesium, aluminum, titanium, chromium, nickel, and indium, and aluminum is preferred from the viewpoints of cost, etc. A material for forming the inorganic oxide thin film is not particularly restricted as long as it is one that can be formed into a film; examples thereof include silicon oxide, aluminum oxide, and magnesium oxide, and silicon oxide, aluminum oxide, and magnesium oxide are preferred. Among these, because of being superior in gas-barrier properties, multi-component inorganic oxide thin films containing silicon oxide and aluminum oxide are more preferred, and silicon oxide/aluminum oxide two-component inorganic oxide thin films are most preferred. The silicon oxide referred herein include mixtures of various types of silicon oxides such as SiO and $SiO_2$; the aluminum oxide referred herein include various types of aluminum oxides such as AlO and $Al_2O_3$.

The reason why the multi-component inorganic oxide thin films containing silicon oxide and aluminum oxide are superior in gas-barrier properties is because it is possible to change the flexibility and gas-barrier properties of the multi-component inorganic oxide thin film by the proportion of the inorganic substance in the film and a good thin film having well-balanced performance can be obtained. Moreover, it is because when an adhesive layer is formed on an inorganic thin film layer as described later, a high adhesion power is easily obtained between the multi-component inorganic oxide thin film containing silicon oxide and aluminum oxide and the adhesive layer.

When forming a silicon oxide/aluminum oxide two-component inorganic oxide thin film, the content of aluminum oxide in the inorganic oxide thin film is preferably 20% by mass or more, more preferably 30% by mass or more, and even more preferably 40% by mass or more; it is preferably 99% by mass or less, more preferably 75% by mass or less, and even more preferably 60% by mass or less. If the content of aluminum oxide in the silicon oxide/aluminum oxide two-component inorganic oxide thin film is 20% by mass or more, gas-barrier properties improve more; if it is 99% by mass or less, the softness of a vapor-deposited film becomes good and a gas-barrier multilayer film becomes stronger against bending or dimensional change, so that an effect of combined use of both the materials improves more.

When the relation between the value of the specific gravity of an inorganic oxide thin film and the content (% by mass) of aluminum oxide in the inorganic oxide thin film is expressed by D=0.01 A+b (D: the specific gravity of the thin film; A: % by mass of aluminum oxide in the thin film), the structure of silicon oxide/aluminum oxide-based thin film becomes coarse when the value of b is within the region smaller than 1.6; the silicon oxide/aluminum oxide two-component inorganic oxide thin film tends to become hard when the value of b is within the region larger than 2.2.

For this reason, as to the specific gravity of the silicon oxide/aluminum oxide two-component inorganic oxide thin film as an inorganic oxide thin film, the value of b is preferably 1.6 to 2.2, more preferably 1.7 to 2.1 when the relation between the value of the specific gravity of the thin film and the content (% by mass) of aluminum oxide in the film is expressed by D=0.01 A+b (D: the specific gravity of the thin film; A: % by mass of aluminum oxide in the thin film), but it is not limited to within these ranges. A multi-component inorganic oxide thin film containing silicon oxide/aluminum oxide and additionally containing other inorganic oxides also has a significant effect as a gas-barrier layered article.

In the present invention, the thickness of the inorganic thin film layer is preferably 1 nm or more and more preferably 5 nm or more; it is preferably 800 nm or less and more preferably 500 nm or less. If the thickness is 1 nm or more, gas-barrier properties improve more. Even if the thickness is made excessively greater than 800 nm, any effect of improving in gas-barrier properties equivalent thereto is not obtained.

A method for forming an inorganic thin film layer will be described with reference to a silicon oxide/aluminum oxide two-component inorganic oxide thin film. As a thin film formation method by a vapor deposition technique, physical vapor deposition methods such as a vacuum vapor deposition method, a sputtering method, an ion plating method, or CVD methods (chemical vapor deposition methods) are appropriately used. For example, when adopting a vacuum deposition method, a mixture of $SiO_2$ and $Al_2O_3$, or a mixture of $SiO_2$ and Al is used as a raw material of vapor deposition. For heating can be employed resistance heating, high-frequency induction heating, electron beam heating, and so on; it is also permitted to introduce oxygen, nitrogen, hydrogen, argon, carbon dioxide gas, steam, or the like as a reaction gas or to employ reactive vapor deposition using such means as ozone addition and ion assistance. Moreover, it is also permitted to optionally change film formation conditions, for example, to add a bias to the plastic film, or to heat or cool the plastic film. Likewise, the above-mentioned vapor deposition material, reaction gas, substrate bias, heating/cooling, and so on may be changed also when employing a sputtering method or a CVD method. By such methods, it becomes possible to obtain a gas-barrier multilayer film having superior performance, specifically, being transparent, superior in gas-barrier properties, and capable of withstanding various treatments, such as a boiling treatment, a retort treatment, and a Gelbo test (flexure resistance test).

4. Anchor Coating Layer

It is preferred for the gas-barrier multilayer film of the present invention to have an anchor coating layer between the inorganic thin film layer and the gas-barrier resin composition layer. Inclusion of such an anchor coating layer makes it possible to increase the adhesive force between the inorganic thin film layer and the gas-barrier resin composition layer.

The anchor coating layer is formed from a composition for an anchor coating layer containing an anchor coating agent resin composition and a solvent. Examples of the anchor coating agent resin composition include compositions prepared by adding a curing agent, such as an epoxy-based curing agent, an isocyanate-based curing agent, or a melamine-based curing agent, to a resin such as a urethane-based resin, a polyester-based resin, an acrylic resin, a titanium-based resin, an isocyanate-based resin, an imine-based resin, or a polybutadiene-based resin. Examples the solvent include aromatic solvents, such as benzene and toluene, alcohol solvents, such as methanol and ethanol; ketone solvents, such as acetone and methyl ethyl ketone; ester solvents, such as ethyl acetate and butyl acetate; polyhydric alcohol derivatives, such as ethylene glycol monomethyl ether.

It is preferred that the anchor coating agent resin composition contain a silane coupling agent having at least one kind of organic functional group. Examples of the organic functional group include an alkoxy group, an amino group, an epoxy group, and an isocyanate group. The amount of the silane coupling agent added is preferably 0.1% by mass or more and more preferably 3% by mass or more; it is preferably 10% by mass or less, and more preferably 7% by mass or less in the anchor coating agent resin composition (100% by mass in total of the resin, curing agent and silane coupling agent). If the amount added is 0.1% by mass or more, lamination strength after retort treatment increases more.

The thickness of the anchor coating layer is preferably 0.05 μm or more, more preferably 0.10 μm or more, and even more preferably 0.15 μm or more; it is preferably 0.5 μM or less, more preferably 0.3 μm or less, and even more preferably 0.25 μm or less. If the thickness of the anchor coating layer is 0.05 μm or more, a decrease in lamination strength caused by retort treatment is suppressed more; if it is 0.5 μm or less, uneven coating does not occur, so that gas-barrier properties become better.

5. Primer Coating Layer

In the gas-barrier multilayer film of the present invention, a primer coating layer may be provided between the plastic film and the inorganic thin film layer. Inclusion of such a primer coating layer makes it possible to increase the planarity of the gas-barrier multilayer film or to further increase the adhesive force between the plastic film and the inorganic thin film layer.

The primer coating layer can be formed from a coating liquid for a primer coating layer in which a resin component for constituting the primer coating layer has been dissolved or dispersed. Examples of the resin for constituting the primer coating layer include a polyurethane resin and a copolymerized polyester resin. In particular, it is preferred to use a polyurethane resin and a copolymerized polyester resin in combination as the resin for constituting the primer coating layer.

6. Lamination with Other Films, Etc

The gas-barrier multilayer film of the present invention can be used for various applications including food packaging application and can be laminated with other materials such as a heat seal layer, a print layer, other resin films, and an adhesive layer for bonding these layers in conformity with such an intended application. In lamination can be employed known means, such as a method involving direct melt-extrusion onto the gas-barrier multilayer film of the present invention, a method by coating, a method involving laminating films directly or via an adhesive. When high barrier properties are required, two or more gas-barrier multilayer films of the present invention may also be laminated.

For example, when using as a retortable pouch or the like or a cover material of a retorted food, it is preferred to form a heat seal layer of polyethylene, polypropylene or the like on a gas-barrier resin composition layer. It is also permitted to laminate other resin films between the gas-barrier resin composition layer and the heat seal layer. As the other resin films, resin films exemplified as plastic films can be used. In the lamination thereof, they can be laminated via an adhesive.

In use for a solar battery, the gas-barrier multilayer film of the present invention can be used as a back sheet with lamination with a weather resistant film, such as a fluorine-based film or a hydrolysis resistant polyester film, a light-reflective white film, a black-colored film, or the like. In use as a film on the light-receiving side of a solar battery, the gas-barrier multilayer film of the present invention may be provided with an anti-fouling coating layer, an anti-reflection coating layer, an anti-glare coating layer, a hard coating layer, etc. or other films provided with such coating layers may be laminated. Also in applications such as organic EL and electronic paper, an anti-fouling coating layer, an anti-reflection coating layer, an anti-glare coating layer, a hard coating layer, etc. may be provided or other films provided with such coating layers may be laminated. Such other coating layers and other films may be provided on whichever side of the gas-barrier multilayer film of the present invention.

EXAMPLES

The present invention will be described in detail below by way of examples, but the present invention is not limited by the following examples, and modifications which do not depart from the gist of the present invention are allowed and embraced within the technical scope of the present invention.

1. Evaluation Method

1-1. Preparation of Laminated Gas-Barrier Multilayer Film

On the gas-barrier resin composition layer of each of gas-barrier multilayer film Nos. 1 through 23 (an anchor coating layer for No. 16) was stacked a non-stretched polypropylene film ("P1147" (70 μm in thickness), produced by Toyobo Co., Ltd.) as a thermally bondable resin by a dry lamination process using a urethane-based, two-component, curable adhesive, followed by aging at 40° C. for four days, affording gas-barrier multilayer films. The thickness of each of the adhesive layers after drying was 3 μm.

1-2. Steam Permeability Measurement

For laminated gas-barrier multilayer films, a steam permeability was measured under an atmosphere having a temperature of 40° C. and a humidity of 100% RH using a steam permeability analyzer ("PERMATRAN-W 3/33MG", manufactured by MOCON, Inc.) according to the B method of JIS K7129. Moisture conditioning to gas-barrier multilayer films was directed so that steam would permeate from the plastic film side toward the gas-barrier resin composition layer side. The steam permeability was also measured in the same manner as described above for the laminated gas-barrier multilayer films having been subjected to a retort treatment at a temperature of 121° C. and an atmospheric pressure of 0.2 MPa (2 kgf/cm$^2$) for 30 minutes and subsequent drying at 40° C. for one day.

1-3. Oxygen Permeability

For laminated gas-barrier multilayer films, an oxygen permeability was measured under an atmosphere having a temperature of 23° C. and a humidity of 65% RH using an oxygen permeability analyzer ("OX-TRAN 2/20", manufactured by MOCON, Inc.) according to Appendix 1 of JIS K7126-1 (2006). The oxygen permeability was also measured in the same manner as described above for the laminated gas-barrier multilayer films having been subjected to a retort treatment at a temperature of 121° C. and an atmospheric pressure of 0.2 MPa (2 kgf/cm$^2$) for 30 minutes and subsequent drying at 40° C. for one day.

1-4. Method of Measuring Lamination Strength

A laminated gas-barrier multilayer film was cut into a size of 15 mm in width and 200 mm in length to form a specimen and the lamination strength thereof was measured under conditions including a temperature of 23° C. and a relative humidity of 65% by using a TENSILON universal material testing instrument ("TENSILON UMT-II-500" manufactured by Toyo Baldwin Co., Ltd.). Water was applied to between the gas-barrier multilayer film and a non-stretched polypropylene film and then the strength at the time of peeling the films at a peeling angle of 90 degrees was measured with a tensile speed adjusted to 200 mm/minute. The lamination strength was also measured in the same manner as described above for the laminated gas-barrier multilayer films having been subjected to a retort treatment at a temperature of 121° C. and an atmospheric pressure of 0.2 MPa (2 kgf/cm$^2$) for 30 minutes and subsequent drying at 40° C. for one day.

1-5. Thickness of Gas-Barrier Resin Composition Layer

A sample of a gas-barrier multilayer film was cut into a strip form of 2 mm×5 mm and was embedded in an epoxy resin. The embedded sample was sliced into an ultrathin section with a microtome and then stained using ruthenium tetraoxide as a dye. Observation was performed at an acceleration voltage of 200 kV and observation ratios of 5,000 times and 10,000 times by using a transmission electron microscope ("JEM2100" manufactured by JEOL Co., Ltd.), and the thickness of the gas-barrier resin composition layer was measured.

2. Preparation

2-1. Preparation of Plastic Film

Polyethylene terephthalate (PET) having an intrinsic viscosity of 0.62 (30° C., phenol/tetrachloroethane (mass ratio)=60/40) and containing 100 ppm of silica was preliminarily crystallized, then dried, subsequently extruded at 280° C. by using an extruder equipped with a T-shaped die, and then rapidly cooled and solidified on a drum having a surface temperature of 40° C., so that an amorphous sheet was obtained. Next, the resulting sheet was drawn four times in the longitudinal direction between a heating roll and a chill roll, affording a uniaxially drawn PET film.

2-2. Preparation of Coating Liquid for Forming Anchor Coating Layer

Preparation Example 1

An isocyanate-based curing agent ("TAKELAC (registered trademark) A-50", produced by Mitsui Chemicals, Inc.) was added to a urethane-based resin ("TAKELAC A525-S", produced by Mitsui Chemicals, Inc.) and a solid concentration was adjusted to 6.5% by mass using ethyl acetate as a solvent. To this was added an epoxy-based silane coupling agent ("KBM403", produced by Shin-Etsu Chemical Co., Ltd.) so that the content thereof in an anchor coating agent resin composition (100% by mass of the resin, the curing agent, and the silane coupling agent in total) would become 5% by mass, thereby affording coating liquid No. 1 for an anchor coating layer.

Preparation Example 2

Coating liquid No. 2 for an anchor coating layer was prepared in the same manner as in Preparation Example 1 except for changing the silane coupling agent to an isocyanate-based silane coupling agent ("KBE9007", produced by Shin-Etsu Chemical Co., Ltd.).

Preparation Example 3

Coating liquid No. 3 for an anchor coating layer was prepared in the same manner as in Preparation Example 1 except for changing the silane coupling agent to an amin-based silane coupling agent ("KBM603", produced by Shin-Etsu Chemical Co., Ltd.).

Preparation Example 4

Coating liquid No. 4 for an anchor coating layer was prepared in the same manner as in Preparation Example 1 except for changing the resin to an urethane-based resin ("EL-530A", produced by Toyo-Morton, Ltd.) and the curing agent to an isocyanate-based curing agent ("EL-530B", produced by Toyo-Morton, Ltd.).

Preparation Example 5

An isocyanate-based curing agent ("TAKELAC A-50", produced by Mitsui Chemicals, Inc.) was added to an urethane-based resin ("TAKELAC (registered trademark) A525-S", produced by Mitsui Chemicals, Inc.) and a solid concentration was adjusted to 6.5% by mass using ethyl acetate as a solvent, thereby affording coating liquid No. 5 for an anchor coating layer.

2-3. Preparation of Material of Gas-Barrier Resin Composition Layer

<Preparation of Ethylene-Vinyl Alcohol-Based Copolymer Solution>

To a mixed solvent of 20.996 parts by mass of purified water and 51 parts by mass of n-propanol (NPA) was added 15 parts by mass of an ethylene-vinyl alcohol copolymer (trade name: "SG-525" (a polymer prepared by saponifying an ethylene-vinyl acetate copolymer; ethylene content: 26 mol %; degree of saponification of vinyl acetate component: about 100%), produced by The Nippon Synthetic Chemical Industry Co., Ltd. (hereinafter, this may be abbreviated as "EVOH")). Moreover, 13 parts by mass of an aqueous hydrogen peroxide solution (concentration: 30% by mass) and 0.004 parts by mass of iron sulfate ($FeSO_4$) were added and heated up to 80° C. with stirring, followed by a reaction for about 2 hours. Following subsequent cooling, catalase was added so that its concentration would become 3000 ppm and residual hydrogen peroxide was removed, so that an approximately transparent ethylene-vinyl alcohol-based copolymer solution (EVOH solution) having a solid concentration of 15% by mass was obtained.

<Preparation of Polyvinyl Alcohol Resin Solution>

To 70 parts by mass of a mixed solvent of 40% by mass of purified water and 60% by mass of n-propanol (NPA) was added and dissolved 30 parts by mass of completely saponified polyvinyl alcohol resin (trade name: "Gosenol (registered trademark) NL-05" (degree of saponification: 99.5% or more), produced by The Nippon Synthetic Chemical Industry Co., Ltd.), so that a transparent polyvinyl alcohol solution having a solid concentration of 30% by mass was obtained.

<Preparation of Inorganic Layered Compound Dispersion Liquid>

Into 96 parts by mass of purified water was added with stirring 4 parts by mass of montmorillonite (trade name: "Kunipia (registered trademark) F", produced by Kunimine Industries Co., Ltd.), an inorganic layered compound, which was then fully dispersed under a set pressure of 50 MPa by using a high pressure dispersion apparatus. Then, it was held at 40° C. for one day, thereby affording an inorganic layered compound dispersion liquid having a solid concentration of 4% by mass.

<Additives>

Cross-linking agent: zirconium oxydichloride (trade name "Zircosol (registered trademark) Zc-20" (solid concentration: 20% by mass), produced by Daiichi Kigenso Kagaku Kogyo Co., Ltd.)

Cross-linking agent: titanium lactate (trade name: "ORGATIX (registered trademark) TC-310" (solid concentration: about 45% by mass), produced by Matsumoto Fine Chemical Co., Ltd.)

Silane coupling agent: 3-glycidoxypropyltriethoxysilane (trade name: "KBE-403" (solid concentration: 100% by mass), produced by Shin-Etsu Chemical Co., Ltd.)

2-4. Preparation of Coating Liquid for Forming Gas-Barrier Resin Composition Layer Preparation Example 1

To 62.30 parts by mass of mixed a solvent A (purified water:n-propanol (mass ratio)=40:60) was added 31.75 parts by mass of an EVOH solution, followed by fully stirring and mixing. In addition, to this solution was added 5.95 parts by mass of an inorganic layered compound dispersion liquid with high speed stirring. To 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

The dispersion liquid prepared by the above-described operations was subjected further to a dispersion treatment under a set pressure of 50 MPa using a high-pressure dispersion apparatus. To 97 parts by mass of the mixed liquid resulting from the dispersion treatment were added 0.75 parts by mass of zirconium oxydichloride as an additive, 0.9 parts by mass of purified water, and 1.35 parts by mass of NPA, followed by mixing and stirring, and then the resultant was filtered through a 255-mesh filter (opening: 60 μm), so that coating liquid No. 1 having a solid concentration of 5% by mass for forming a gas-barrier resin composition layer was obtained.

Preparation Example 2

Coating liquid No. 2 having a solid concentration of 5% by mass for forming a gas-barrier resin composition layer was obtained in the same manner as in Preparation Example 1 except for changing the amounts of the mixed solvent A, the EVOH solution, and the inorganic layered compound dispersion liquid used to 65.76 parts by mass of the mixed solvent A, 33.00 parts by mass of the EVOH solution, and 1.24 parts by mass of the inorganic layered compound dispersion liquid.

Preparation Example 3

Coating liquid No. 3 having a solid concentration of 5% by mass for forming a gas-barrier resin composition layer was obtained in the same manner as in Preparation Example 1 except for changing the amounts of the mixed solvent A, the EVOH solution, and the inorganic layered compound dispersion liquid used to 64.00 parts by mass of the mixed solvent A, 32.36 parts by mass of the EVOH solution, and 3.64 parts by mass of the inorganic layered compound dispersion liquid.

Preparation Example 4

Coating liquid No. 4 having a solid concentration of 5% by mass for forming a gas-barrier resin composition layer was obtained in the same manner as in Preparation Example 1 except for changing the amounts of the mixed solvent A, the EVOH solution, and the inorganic layered compound dispersion liquid used to 66.21 parts by mass of the mixed solvent A, 33.17 parts by mass of the EVOH solution, and 0.62 parts by mass of the inorganic layered compound dispersion liquid.

Preparation Example 5

Coating liquid No. 5 having a solid concentration of 5% by mass for forming a gas-barrier resin composition layer was obtained in the same manner as in Preparation Example 1 except for changing the amounts of the mixed solvent A, the EVOH solution, and the inorganic layered compound dispersion liquid used to 60.67 parts by mass of the mixed solvent A, 31.15 parts by mass of the EVOH solution, and 8.18 parts by mass of the inorganic layered compound dispersion liquid.

Preparation Example 6

Coating liquid No. 6 having a solid concentration of 5% by mass for forming a gas-barrier resin composition layer was obtained in the same manner as in Example 1 except for changing the additive to 0.15 parts by mass of 3-glycidoxy-propyltriethoxysilane, and the amounts of the purified water and the NPA used to 1.14 parts by mass of the purified water and 1.71 parts by mass of the NPA.

Preparation Example 7

Coating liquid No. 7 having a solid concentration of 5% by mass for forming a gas-barrier resin composition layer was obtained in the same manner as in Example 1 except for changing the additive to 0.33 parts by mass of titanium lactate, and the amounts of the purified water and the NPA used to 1.07 parts by mass of the purified water and 1.60 parts by mass of the NPA.

Preparation Example 8

Coating liquid No. 8 having a solid concentration of 5% by mass for forming a gas-barrier resin composition layer was obtained in the same manner as in Preparation Example 1 except for changing the amounts of the mixed solvent A, the EVOH solution, and the inorganic layered compound dispersion liquid used to 59.10 parts by mass of the mixed solvent A, 30.58 parts by mass of the EVOH solution, and 10.32 parts by mass of the inorganic layered compound dispersion liquid.

Preparation Example 9

To 61.52 parts by mass of mixed a solvent A was added 32.40 parts by mass of an EVOH solution, followed by fully stirring and mixing. In addition, to this solution was added 6.08 parts by mass of an inorganic layered compound dispersion liquid with high speed stirring. To 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

The dispersion liquid prepared by the above-described operations was subjected further to a dispersion treatment under a set pressure of 50 MPa using a high-pressure dispersion apparatus. To 97 parts by mass of the mixed liquid resulting from the dispersion treatment were added 0.25 parts by mass of zirconium oxydichloride, and 2.75 parts by mass of the mixed solvent A, followed by mixing and stirring, and then the resultant was filtered through a 255-mesh filter, so that coating liquid No. 9 having a solid concentration of 5% by mass for forming a gas-barrier resin composition layer was obtained.

Preparation Example 10

To 65.02 parts by mass of mixed a solvent A was added 29.46 parts by mass of an EVOH solution, followed by fully stirring and mixing. In addition, to this solution was added 5.52 parts by mass of an inorganic layered compound dispersion liquid with high speed stirring. To 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

The dispersion liquid prepared by the above-described operations was subjected further to a dispersion treatment under a set pressure of 50 MPa using a high-pressure dispersion apparatus. To 97 parts by mass of the mixed liquid resulting from the dispersion treatment were added 2.50 parts by mass of zirconium oxydichloride, and 0.50 parts by mass of the mixed solvent A, followed by mixing and stirring, and then the resultant was filtered through a 255-mesh filter, so that coating liquid No. 10 having a solid concentration of 5% by mass for forming a gas-barrier resin composition layer was obtained.

Preparation Example 11

Without an Inorganic Layered Compound

To 66.67 parts by mass of mixed a solvent A was added 33.33 parts by mass of an EVOH solution, followed by fully stirring and mixing. In addition, to 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

To 97 parts by mass of the thus-obtained mixed liquid was added 0.75 parts by mass of zirconium oxydichloride, and 2.25 parts by mass of the mixed solvent A, followed by mixing and stirring, and then the resultant was filtered through a 255-mesh filter, so that coating liquid No. 11 having a solid concentration of 5% by mass for forming a gas-barrier resin composition layer was obtained.

Preparation Example 12

Polyvinyl Alcohol Resin Use

To 78.17 parts by mass of mixed a solvent A was added 15.87 parts by mass of a polyvinyl alcohol resin solution, followed by fully stirring and mixing. In addition, to this solution was added 5.95 parts by mass of an inorganic layered compound dispersion liquid with high speed stirring. To 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

The dispersion liquid prepared by the above-described operations was subjected further to a dispersion treatment under a set pressure of 50 MPa using a high-pressure dispersion apparatus. To 97 parts by mass of the mixed liquid resulting from the dispersion treatment were added 0.75 parts by mass of zirconium oxydichloride, and 2.25 parts by mass of the mixed solvent A, followed by mixing and stirring, and then the resultant was filtered through a 255-mesh filter, so that coating liquid No. 12 having a solid concentration of 5% by mass for forming a gas-barrier resin composition layer was obtained.

Preparation Example 13

Without an Additive

To 62.30 parts by mass of mixed a solvent A was added 31.75 parts by mass of an EVOH solution, followed by fully stirring and mixing. In addition, to this solution was added 5.95 parts by mass of an inorganic layered compound dispersion liquid with high speed stirring. To 100 parts by mass of this dispersion liquid was added 3 parts by mass of a cation exchange resin, followed by stirring for one hour at such a stirring speed that no breakage of the ion exchange resin occurred, thereby removing cations, and then only the cation exchange resin was removed by filtration using a strainer.

The dispersion liquid prepared by the above-described operations was subjected further to a dispersion treatment under a set pressure of 50 MPa using a high-pressure dispersion apparatus. Then the resultant was filtered through a 255-mesh filter, so that coating liquid No. 13 having a solid concentration of 5% by mass for forming a gas-barrier resin composition layer was obtained.

3. Preparation of Gas-Barrier Multilayer Film

Production Example 1

The uniaxially drawn PET film obtained above was drawn to 4.0 times in the transverse direction at a temperature of 120° C. and then was subjected to a heat setting treatment while performing 6% relaxation in the transverse direction and setting the temperature of a heat setting zone to 225° C. Treatment times at respective temperatures were three seconds at a preheating temperature of 100° C., five seconds at a drawing temperature of 120° C., and eight seconds at a heat setting treatment temperature of 225° C. Then, it was cooled and its both edges were trimmed, so that a 12-µm thick biaxially drawn PET film was formed continuously over 1000 m or more and thereby a mill roll was prepared. The resulting mill roll was slit over a width of 400 mm and a length of 1000 m and then was wound on a 3-inch paper sleeve, thereby affording a PET film. On the PET film was formed a two-component inorganic oxide thin film layer of silicon oxide and aluminum oxide (silicon oxide/aluminum oxide ratio (mass ratio)=60/40) as an inorganic thin film layer.

As to the inorganic thin film layer, a two-component inorganic oxide thin film of aluminum oxide and silicon dioxide was formed by an electron beam vapor deposition process using granular $SiO_2$ (purity: 99.99%) having a size of about 3 mm to 5 mm and granular $Al_2O_3$ (purity: 99.9%) having a size of about 3 mm to 5 mm as a vapor deposition source. The vapor deposition materials were charged with division into two portions without mixing. By the use of an EB (electron beam) gun as a heat source, $Al_2O_3$ and $SiO_2$ were heated respectively by time sharing. The emission current of the EB gun at that time was set to 1.2 A, and the respective materials were heated so that the mass ratio of $Al_2O_3$ to $SiO_2$ might become 40:60. The film feeding rate was adjusted to 30 m/minute and the pressure in vapor deposition was adjusted to $1 \times 10^{-2}$ Pa. Moreover, the temperature of a roll for cooling a film in vapor deposition was adjusted to −10° C. The thus-obtained inorganic thin film layer was 27 nm in thickness.

The coating liquid No. 1 for an anchor coating layer was applied onto the inorganic thin film layer by a gravure roll coating method and then was dried, so that an anchor coating layer was formed. The thickness of the anchor coating layer after drying was 0.30 µm. The coating liquid No. 1 for forming a gas-barrier resin composition layer was applied onto the anchor coating layer by a gravure roll coating method and then was dried at 160° C., so that a gas-barrier resin composition layer was formed and thereby gas-barrier multilayer film No. 1 was prepared. The thickness of the gas-barrier resin composition layer after drying was 0.25 μm.

Production Examples 2 to 10

Gas-barrier multilayer films Nos. 2 through 10 were prepared in the same manner as in Production Example 1 except for changing the coating liquid for forming a gas-barrier resin composition layer to the coating liquids Nos. 2 through 10 for gas-barrier resin composition layer.

Production Examples 11

Gas-barrier multilayer films No. 11 was prepared in the same manner as in Production Example 1 except for changing the mass ratio of silicon oxide and aluminum oxide (silicon oxide/aluminum oxide) in a two-component inorganic oxide thin film layer of silicon oxide and aluminum oxide to 50/50.

Production Examples 12 to 15

Gas-barrier multilayer films Nos. 12 through 15 were prepared in the same manner as in Production Example 1 except for changing the coating liquid for an anchor coating layer to the coating liquids Nos. 2 through 5 for an anchor coating layer.

Production Example 16

Gas-barrier multilayer film No. 16 was prepared in the same manner as in Production Example 1 except for failing to form a gas-barrier resin composition layer.

Production Example 17

Gas-barrier multilayer film No. 17 was prepared in the same manner as in Production Example 1 except for failing to form an inorganic oxide thin film layer.

Production Examples 18 to 20

Gas-barrier multilayer films Nos. 18 through 20 were prepared in the same manner as in Production Example 1 except for changing the coating liquid for forming a gas-barrier resin composition layer to the coating liquids Nos. 11 through 13 for gas-barrier resin composition layer.

Production Examples 21

Gas-barrier multilayer films No. 21 was prepared in the same manner as in Production Example 1 except for changing the thickness of the gas-barrier resin composition layer to 0.01 μm.

Production Examples 22

Gas-barrier multilayer films No. 22 was prepared in the same manner as in Production Example 1 except for changing the thickness of the anchor coating layer to 0.01 μm.

Production Examples 23

Gas-barrier multilayer films No. 23 was prepared in the same manner as in Production Example 1 except for changing the thickness of the gas-barrier resin composition layer to 0.7 μm.

The configurations and evaluation results of the prepared gas-barrier multilayer films Nos. 1 through 23 are shown in Tables 1 and 2.

TABLE 1

| The gas-barrier multilayer film No. | | | | 1 | 2 | 3 | 4 | 5 | 6 |
|---|---|---|---|---|---|---|---|---|---|
| Inorganic thin film layer | Composition (mass ratio) ($Al_2O_3/SiO_2$) | | | 40/60 | 40/60 | 40/60 | 40/60 | 40/60 | 40/60 |
| | Thickness (nm) | | | 27 | 27 | 27 | 27 | 27 | 27 |
| Anchor coating layer | Anchor coating agent resin composition | Resin composition | | Urethane-based adhesive | Urethane-based adhesive | Urethane-based adhesive | Urethane-based adhesive | Urethane-based adhesive | Urethane-based adhesive |
| | | Silane coupling agent | Type | Epoxy based | Epoxy based | Epoxy based | Epoxy based | Epoxy based | Epoxy based |
| | | | Content (% by mass) | 5 | 5 | 5 | 5 | 5 | 5 |
| | Thickness (μm) | | | 0.3 | 0.3 | 0.3 | 0.3 | 0.3 | 0.3 |
| Gas-barrier resin composition layer | Composition of Gas barrier resin composition | Copolymer | | EVOH | EVOH | EVOH | EVOH | EVOH | EVOH |
| | | Inorganic layered compound | Type | Montmo-rillonite | Montmo-rillonite | Montmo-rillonite | Montmo-rillonite | Montmo-rillonite | Montmo-rillonite |
| | | | Content (% by mass) | 4.6 | 1.0 | 2.8 | 0.5 | 6.3 | 4.6 |
| | | Cross-linking agent | Type | Zirconium oxy-dichloride | Zirconium oxy-dichloride | Zirconium oxy-dichloride | Zirconium oxy-dichloride | Zirconium oxy-dichloride | — |
| | | | Content (% by mass) | 3.0 | 3.0 | 3.0 | 3.0 | 3.0 | — |
| | | Coupling agent | Type | — | — | — | — | — | Isocyanate group-containing silane coupling |
| | | | Content (% by mass) | — | — | — | — | — | 3.0 |
| | Thickness (μm) | | | 0.25 | 0.25 | 0.25 | 0.25 | 0.25 | 0.25 |
| Before retort treatment | Lamination strength (N/15 mm) | | | 4.8 | 6.0 | 5.4 | 5.7 | 4.2 | 4.5 |
| | Oxygen permeability (ml/m² dMPa) | | | 4 | 9 | 5 | 10 | 7 | 4 |
| | Steam permeability (g/m²d) | | | 0.7 | 0.9 | 0.7 | 1.0 | 0.9 | 0.7 |
| After retort | Lamination strength (N/15 mm) | | | 3.2 | 4.0 | 8.6 | 3.8 | 3.0 | 3.0 |

TABLE 1-continued

| treatment | Oxygen permeability (ml/m²dMPa) | 8 | 18 | 10 | 18 | 17 | 8 |
|---|---|---|---|---|---|---|---|
| | Steam permeability (g/m²d) | 1.5 | 1.8 | 1.5 | 2.0 | 1.7 | 1.5 |

| | | | 7 | 8 | 9 | 10 | 11 |
|---|---|---|---|---|---|---|---|
| The gas-barrier multilayer film No. | | | | | | | |
| Inorganic thin film layer | Composition (mass ratio) (Al₂O₃/SiO₂) | | 40/60 | 40/60 | 40/60 | 40/60 | 50/50 |
| | Thickness (nm) | | 27 | 27 | 27 | 27 | 27 |
| Anchor coating layer | Anchor coating agent resin composition | Resin composition | Urethane-based adhesive | Urethane-based adhesive | Urethane-based adhesive | Urethane-based adhesive | Urethane-based adhesive |
| | | Silane coupling agent Type | Epoxy based | Epoxy based | Epoxy based | Epoxy based | Epoxy based |
| | | Content (% by mass) | 5 | 5 | 5 | 5 | 5 |
| | Thickness (μm) | | 0.3 | 0.3 | 0.3 | 0.3 | 0.3 |
| Gas-barrier resin composition layer | Composition of Gas barrier resin composition | Copolymer | EVOH | EVOH | EVOH | EVOH | EVOH |
| | | Inorganic layered compound Type | Montmorillonite | Montmorillonite | Montmorillonite | Montmorillonite | Montmorillonite |
| | | Content (% by mass) | 4.6 | 8.0 | 4.7 | 4.3 | 4.6 |
| | | Cross-linking agent Type | Organic titanate compound | Zirconium oxydichloride | Zirconium oxydichloride | Zirconium oxydichloride | Zirconium oxydichloride |
| | | Content (% by mass) | 3.0 | 3.0 | 1.0 | 10.0 | 3.0 |
| | | Coupling agent Type | — | — | — | — | — |
| | | Content (% by mass) | — | — | — | — | — |
| | Thickness (μm) | | 0.25 | 0.25 | 0.25 | 0.25 | 0.25 |
| Before retort treatment | Lamination strength (N/15 mm) | | 4.0 | 4.0 | 3.8 | 6.1 | 4.8 |
| | Oxygen permeability (ml/m² dMPa) | | 6 | 10 | 4 | 11 | 3 |
| | Steam permeability (g/m²d) | | 0.8 | 1.0 | 0.7 | 1.2 | 0.4 |
| After retort treatment | Lamination strength (N/15 mm) | | 2.8 | 2.5 | 2.2 | 4.5 | 3.2 |
| | Oxygen permeability (ml/m²dMPa) | | 10 | 19 | 7 | 20 | 10 |
| | Steam permeability (g/m²d) | | 1.6 | 1.7 | 1.5 | 2.0 | 1.7 |

TABLE 2

| | | | 12 | 13 | 14 | 15 | 16 | 17 |
|---|---|---|---|---|---|---|---|---|
| The gas-barrier multilayer film No. | | | | | | | | |
| Inorganic thin film layer | Composition (mass ratio) (Al₂O₃/SiO₂) | | 40/60 | 40/60 | 40/60 | 40/60 | 40/60 | — |
| | Thickness (nm) | | 27 | 27 | 27 | 27 | 27 | — |
| Anchor coating layer | Anchor coating agent resin composition | Resin composition | Urethane-based adhesive | Urethane-based adhesive | Urethane-based adhesive | Urethane-based adhesive | Urethane-based adhesive | Urethane-based adhesive |
| | | Silane coupling agent Type | Isocyanate besed | Amin besed | Epoxy besed | — | Epoxy besed | Epoxy besed |
| | | Content (% by mass) | 5 | 5 | 5 | — | 5 | 5 |
| | Thickness (μm) | | 0.3 | 0.3 | 0.3 | 0.3 | 0.3 | 0.3 |
| Gas-barrier resin composition layer | Composition of Gas barrier resin composition | Copolymer | EVOH | EVOH | EVOH | EVOH | — | EVOH |
| | | Inorganic layered compound Type | Montmo-rillonite | Montmo-rillonite | Montmo-rillonite | Montmo-rillonite | — | Montmo-rillonite |
| | | Content (% by mass) | 4.6 | 4.6 | 4.6 | 4.6 | — | 4.6 |
| | | Cross-linking agent Type | Zirconium oxy-dichloride | Zirconium oxy-dichloride | Zirconium oxy-dichloride | Zirconium oxy-dichloride | — | Zirconium oxy-dichloride |
| | | Content (% by mass) | 3.0 | 3.0 | 3.0 | 3.0 | — | 3.0 |
| | | Coupling agent Type | — | — | — | — | — | — |
| | | Content (% by mass) | — | — | — | — | — | — |
| | Thickness (μm) | | 0.25 | 0.25 | 0.25 | 0.25 | — | 0.25 |
| Before retort treatment | Lamination strength (N/15 mm) | | 4.7 | 4.8 | 4.7 | 4.7 | 5.2 | 7.5 |
| | Oxygen permeability (ml/m²dMPa) | | 3 | 3 | 3 | 3 | 15 | 50 |
| | Steam permeability (g/m²d) | | 0.4 | 0.4 | 0.4 | 0.5 | 2.1 | 10.0 |
| After retort treatment | Lamination strength (N/15 mm) | | 3.3 | 3.1 | 3.2 | 2.5 | 4.0 | 5.0 |
| | Oxygen permeability (ml/m²dMPa) | | 9 | 10 | 8 | 15 | 68 | 75 |
| | Steam permeability (g/m²d) | | 1.5 | 1.7 | 1.5 | 1.8 | 3.8 | 5.6 |

TABLE 2-continued

| The gas-barrier multilayer film No. | | | | 18 | 19 | 20 | 21 | 22 | 23 |
|---|---|---|---|---|---|---|---|---|---|
| Inorganic thin film layer | Composition (mass ratio) (Al₂O₃/SiO₂) | | | 40/60 | 40/60 | 40/60 | 40/60 | 40/60 | 40/60 |
| | Thickness (nm) | | | 27 | 27 | 27 | 27 | 27 | 27 |
| Anchor coating layer | Anchor coating agent resin composition | Resin composition | | Urethane-based adhesive | Urethane-based adhesive | Urethane-based adhesive | Urethane-based adhesive | Urethane-based adhesive | Urethane-based adhesive |
| | | Silane coupling agent | Type | Epoxy based | Epoxy based | Epoxy based | Epoxy based | Epoxy based | Epoxy based |
| | | | Content (% by mass) | 5 | 5 | 5 | 5 | 5 | 5 |
| | Thickness (μm) | | | 0.3 | 0.3 | 0.3 | 0.3 | 0.01 | 0.3 |
| Gas-barrier resin composition layer | Composition of Gas barrier resin composition | Copolymer | | EVOH | PVA | EVOH | EVOH | EVOH | EVOH |
| | | Inorganic layered compound | Type | — | Montmorillonite | Montmorillonite | Montmorillonite | Montmorillonite | Montmorillonite |
| | | | Content (% by mass) | — | 4.6 | 4.8 | 4.6 | 4.6 | 4.6 |
| | | Cross-linking agent | Type | Zirconium oxydichloride | Zirconium oxydichloride | — | Zirconium oxydichloride | Zirconium oxydichloride | Zirconium oxydichloride |
| | | | Content (% by mass) | 3.0 | 3.0 | — | 3.0 | 3.0 | 3.0 |
| | | Coupling agent | Type | — | — | — | — | — | — |
| | | | Content (% by mass) | — | — | — | — | — | — |
| | Thickness (μm) | | | 0.25 | 0.25 | 0.25 | 0.01 | 0.25 | 0.7 |
| Before retort treatment | Lamination strength (N/15 mm) | | | 3.0 | 2.5 | 2.7 | 2.7 | 1.2 | 2.7 |
| | Oxygen permeability (ml/m² dMPa) | | | 14 | 14 | 16 | 16 | 12 | 3 |
| | Steam permeability (g/m²d) | | | 2.8 | 3.0 | 1.5 | 1.5 | 1.3 | 0.4 |
| After retort treatment | Lamination strength (N/15 mm) | | | 1.4 | Delamination | 0.1 | 4.3 | 0.6 | 0.2 |
| | Oxygen permeability (ml/m²dMPa) | | | 29 | | 32 | 68 | 22 | 20 |
| | Steam permeability (g/m²d) | | | 4.2 | | 3.2 | 3.3 | 2.2 | 2.1 |

The gas-barrier multilayer films Nos. 1 through 15 and 22 satisfy the requirements of the present invention. These films exhibit high lamination strength and low values of oxygen permeability and steam permeability even after retort treatment. Among these, the gas-barrier multilayer films Nos. 1 through 15, each of which had a 0.3-μm thick anchor coating layer between the inorganic thin film layer and the gas-barrier resin composition layer, were excellent in lamination strength after retort treatment.

While the gas-barrier multilayer film No. 16 is one not having a gas-barrier resin composition layer, the gas-barrier multilayer film No. 17 is one not having an inorganic thin film layer, and the gas-barrier multilayer film No. 18 is one in which the gas-barrier resin composition does not contain an inorganic layered compound, these all exhibit high values in both oxygen permeability and steam permeability.

While the gas-barrier multilayer film No. 19 is the case of using PVA as a gas-barrier resin, the gas-barrier multilayer film delaminated from the non-stretched polypropylene film during the retort treatment. While the gas-barrier multilayer film No. 20 is the case where the gas-barrier resin composition contains no additives, this exhibited high values of oxygen permeability and steam permeability before retort treatment and was very weak in lamination strength.

While the gas-barrier multilayer film No. 21 is the case where the thickness of the gas-barrier resin composition layer is less than 0.05 μm, the oxygen permeability after retort treatment became high. In other words, a gas-barrier property after retort treatment was lowered. While the gas-barrier multilayer film No. 23 is the case where the thickness of the gas-barrier resin composition layer exceeds 0.5 μm, the lamination strength after retort treatment was very weak.

INDUSTRIAL APPLICABILITY

According to the present invention, there can be obtained a gas-barrier multilayer film having superior gas-barrier properties against oxygen and steam, being high in interlayer adhesion power, and being superior in lamination strength. In particular, a gas-barrier multilayer film can be obtained which decreases little in gas-barrier properties and interlayer adhesion power even through retort treatment and which is suitable for various applications and high in practicality. Moreover, a gas-barrier multilayer film is formed which is superior in production stability and with which uniform characteristics can be obtained easily.

The gas-barrier film of the present invention is usable not only in foods packaging for retort but also for applications for packaging various foods, medicaments, and industrial products, as well as industrial applications, such as solar batteries, electronic papers, organic EL devices, and semiconductor devices, which require gas-barrier properties and durability stable in a long term in the case of being placed in a high-temperature and high-humidity environment.

The invention claimed is:

1. A gas-barrier multilayer film, comprising a plastic film and an inorganic thin film layer and a gas-barrier resin composition layer being stacked in this order with or without intervention of other layers on at least one surface of the plastic film, wherein
   the gas-barrier resin composition layer is formed from a gas-barrier resin composition comprised of a gas-barrier resin consisting of an ethylene-vinyl alcohol copolymer, an inorganic layered compound, and an additive that is a coupling agent and/or a cross-linking agent,
   the content of the inorganic layered compound in the gas-barrier resin composition is from 0.1% by mass to 7.0% by mass based on 100% by mass in total of the gas-barrier resin, the inorganic layered compound, and the additive,
   the thickness of the gas-barrier resin composition layer is from 0.05 μm to 0.5 μm, and
   the gas-barrier resin composition is dispersed by a high pressure dispersion machine at 100 MPa or lower.

2. The gas-barrier multilayer film according to claim 1, wherein the inorganic layered compound is smectite.

3. The gas-barrier multilayer film according to claim 1, wherein the coupling agent is a silane coupling agent having at least one kind of organic functional group.

4. The gas-barrier multilayer film according to claim 1, which comprises a cross-linking agent for a group capable of forming a hydrogen bond as the cross-linking agent.

5. The gas-barrier multilayer film according to claim 1, wherein a total content of the additive in the gas-barrier resin composition is from 0.3% by mass to 20% by mass.

6. The gas-barrier multilayer film according to claim 1, wherein the inorganic thin film layer comprises at least an inorganic oxide.

7. The gas-barrier multilayer film according to claim 1, which has an anchor coating layer having a thickness of from 0.05 μm to 0.5 μm between the inorganic thin film layer and the gas-barrier resin composition layer.

8. The gas-barrier multilayer film according to claim 7, wherein an anchor coating agent resin composition for forming the anchor coating layer comprises a silane coupling agent having at least one kind of organic functional group.

9. The gas-barrier multilayer film according to claim 8, wherein an amount of the silane coupling agent added in the anchor coating agent resin composition for forming the anchor coating layer is from 0.1% by mass to 10% by mass.

10. The gas-barrier multilayer film according to claim 1, wherein (a) the inorganic layered compound is smectite, (b) the coupling agent is a silane coupling agent having at least one kind of organic functional group, (c) the cross-linking agent is a cross-linking agent for a group capable of forming a hydrogen bond, (d) the additive is present in the gas-barrier resin composition in an amount of from 0.3% by mass to 20% by mass, and (e) the inorganic thin film layer comprises at least an inorganic oxide.

11. The gas-barrier multilayer film according to claim 10, which has an anchor coating layer having a thickness of from 0.05 μm to 0.5 μm between the inorganic thin film layer and the gas-barrier resin composition layer.

12. The gas-barrier multilayer film according to claim 11, wherein an anchor coating agent resin composition for forming the anchor coating layer comprises a silane coupling agent having at least one kind of organic functional group.

13. The gas-barrier multilayer film according to claim 12, wherein an amount of the silane coupling agent added in the anchor coating agent resin composition for forming the anchor coating layer is from 0.1% by mass to 10% by mass.

* * * * *